Sept. 23, 1941.   G. H. BROWN   2,256,732
THERMOSTATIC REGULATOR
Filed Oct. 1, 1938   3 Sheets-Sheet 1
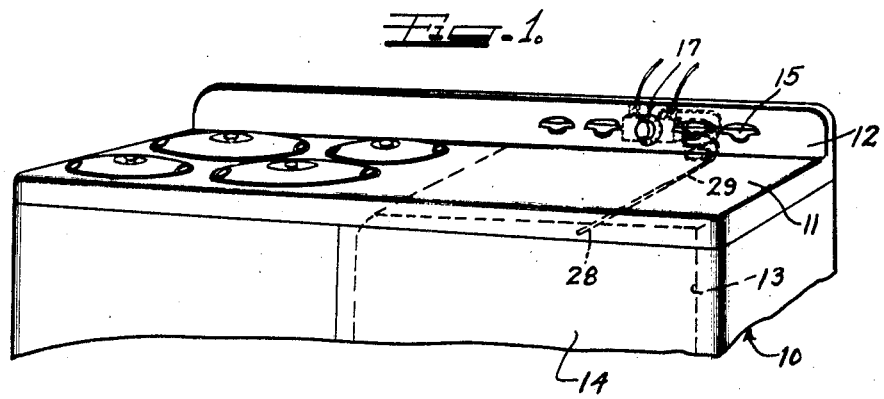
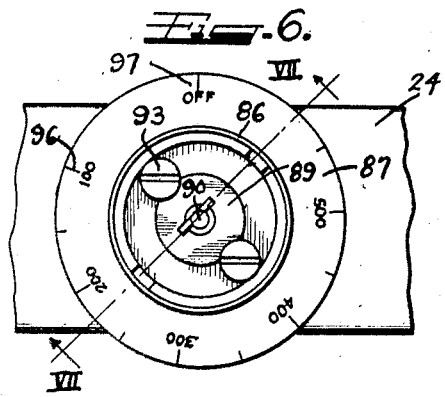
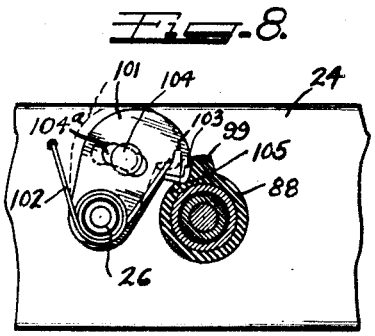
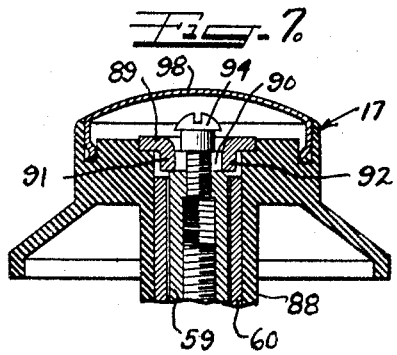
Inventor
GORDON H. BROWN.

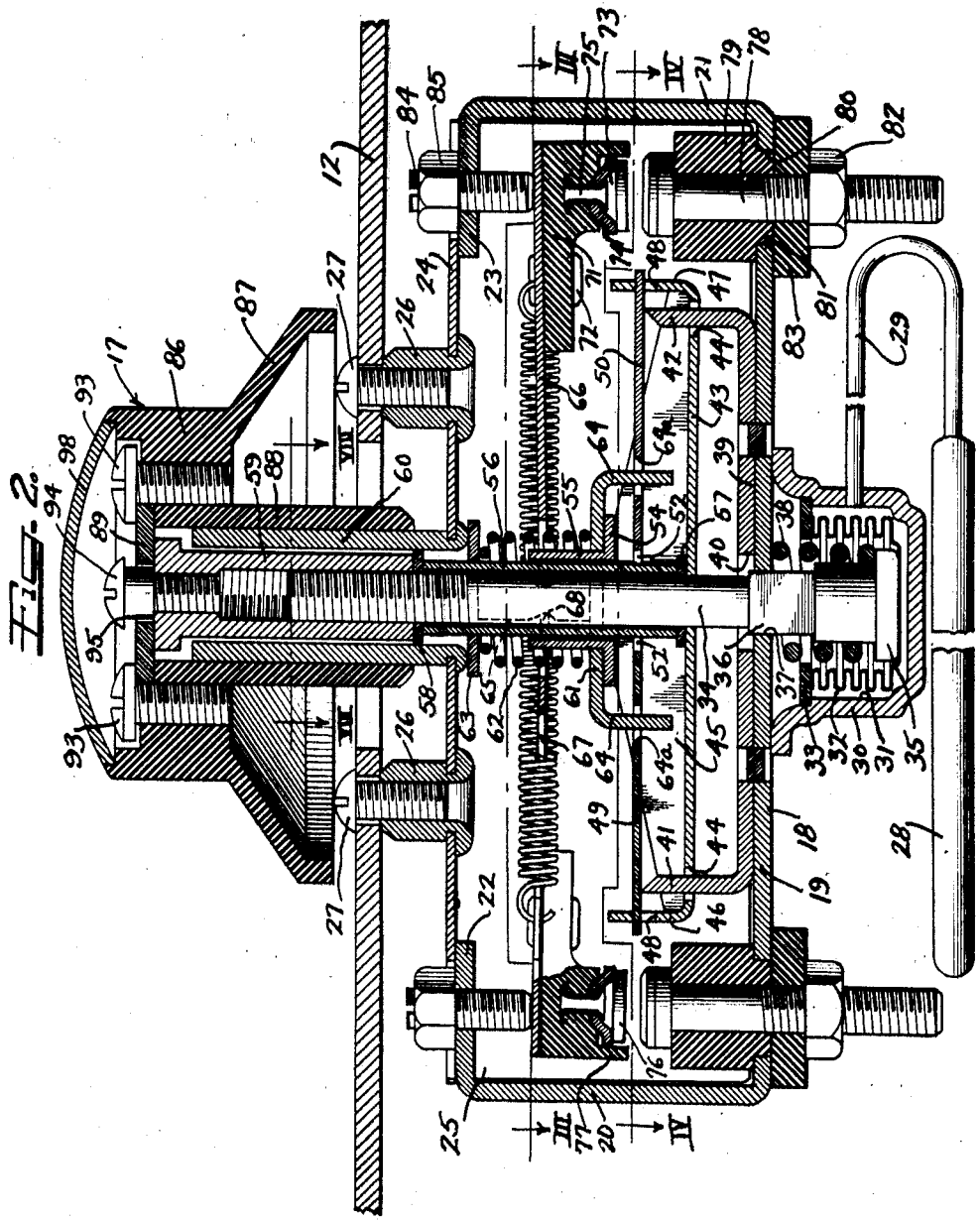

Sept. 23, 1941.　　　G. H. BROWN　　　2,256,732
THERMOSTATIC REGULATOR
Filed Oct. 1, 1938　　　3 Sheets-Sheet 3
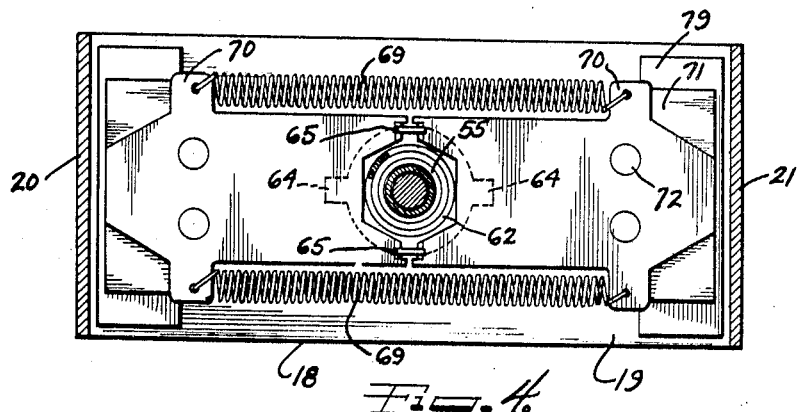
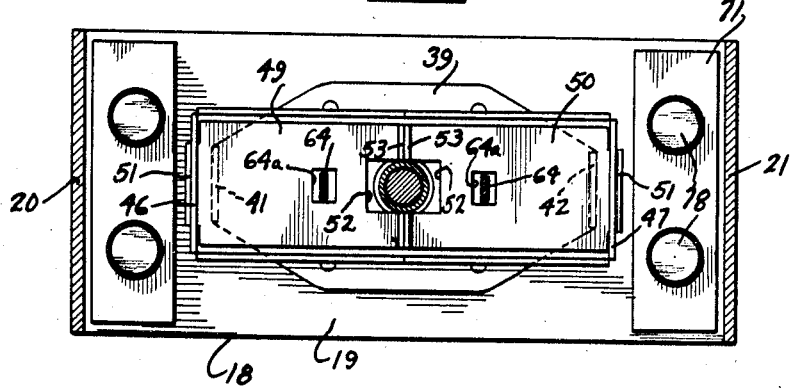
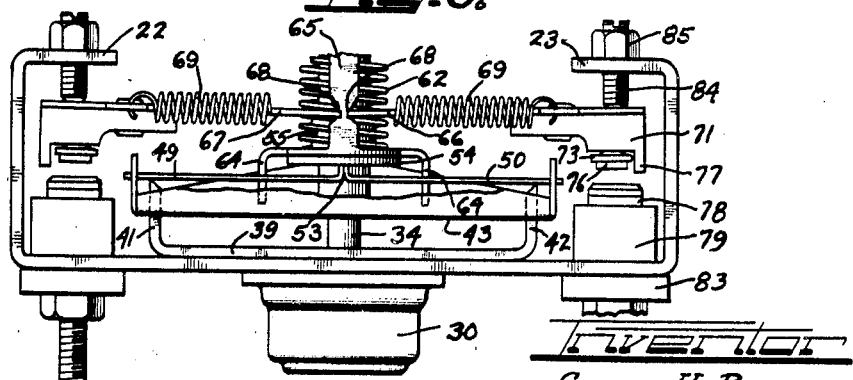
Inventor
GORDON H. BROWN.

Patented Sept. 23, 1941

2,256,732

UNITED STATES PATENT OFFICE 2,256,732

THERMOSTATIC REGULATOR

Gordon H. Brown, Detroit, Mich., assignor to Electromaster, Inc., Detroit, Mich., a corporation of Michigan Application October 1, 1938, Serial No. 232,762

13 Claims. (Cl. 200—140)

The present invention relates to a heat regulator and has particular reference to thermostatic regulators for application to stoves, especially electric stoves, for controlling the temperature within the oven of the stove.

It is a primary object of the herein described invention to provide a thermostatic regulator having improved operating characteristics, and wherein circuit controlling contacts may be actuated to open and closed positions with a "snap" action.

A further object is to provide in a device of the character described improved means for transmitting and amplifying the relatively small movements of a temperature responsive element so as to enable utilizing these movements for the more efficient operation of circuit controlling contacts.

A still further object is to provide in such a device, improved means for presetting the device to actuate its circuit controlling contacts at a predetermined temperature.

It is also an object to provide a thermostatic device having an improved temperature setting dial arrangement which may be independently adjusted as to the temperature indicated for any operating condition of the device.

Still another object is to provide improved means for resiliently opposing setting movements of the dial of a thermostatic regulating device, for limiting the movements of said dial, and further imparting a "click" action to the dial when it is moved to "off" position, thereby apprising the operator through the sense of touch that the dial is set at the "off" position.

A still further object of the invention is to provide an improved device embodying a contact mechanism which may be manually pre-set by means of a dial-knob so as to automatically control a heater circuit and maintain a selected temperature at the heater, and in which the knob-dial also serves as an actuating medium for manually operating the contact mechanism for turning the heater "on" and "off."

Other objects and features of the invention will more fully appear from the following detailed description, taken in connection with the accompanying drawings which illustrate a single embodiment thereof, and in which:

Figure 1 illustrates one manner in which the thermostatic regulator of the present invention may be applied to an electric stove or range;

Figure 2 is an enlarged longitudinal section through the thermostatic regulator of the present invention;

Figure 3 is a transverse sectional view showing the cooperative relationship of certain parts of the device, taken substantially on the line III—III of Figure 2;

Figure 4 is another transverse sectional view, taken substantially on the line IV—IV of Figure 2;

Figure 5 is a fragmentary view of the device with the cover removed and certain parts cut away to show the cooperative relationship of the contact actuating mechanism;

Figure 6 is a fragmentary detail view, showing the means for adjustably securing the regulating dial of the device;

Figure 7 is a fragmentary sectional view taken through the dial assembly, the section being taken substantially on the line VII—VII of Figure 6; and Figure 8 is a section through the dial assembly, taken substantially on the line VIII—VIII of Figure 2, and showing the details of the motion limiting detent associated with the dial.

As shown on the drawings:

Although the thermostatic regulator of the present invention is susceptible of use with electric stoves or ranges of various constructions and may be mounted in the most desirable position in any particular installation, it is disclosed in Figure 1 as being applied to a cabinet type electric range generally indicated at 10. This particular range embodies a cooking table 11 which terminates at the back of the range in an upstanding splash board 12.

The oven compartment, as indicated at 13 in dotted lines, is arranged below a portion of the table top, and access to the oven compartment is made possible by means of a suitable door 14 on the forward side of the range.

In this type of range, it has been found desirable to utilize a portion of the splash board 12 as a mounting support for a plurality of control switches 15 for the various burners. Although the oven control may be placed in any desired location, it has been found convenient to also mount the oven control in alignment with the switches 15, the control mechanism being suitably supported on the back side of the splash board with an adjusting dial and knob 17 on the forward side of the splash board, where it will be easily accessible.

As shown in Figure 2, a control switch mechanism is supported in a casing 18 that is formed from an elongate metallic strip which is folded to form a back casing wall 19 and right angled end walls 20 and 21. The end walls are respectively inwardly deflected at their uppermost ends to form inwardly extending ledges 22 and 23 at the top of the casing. With this construction, the sides of the casing are left open and the top of the casing between the ledges 22 and 23 is also open.

The top and sides of the casing are closed by a cover member 24 having downwardly deflected sides, one of which is indicated at 25. The cover may be removably secured to the casing in any desired manner, such as by screws extending into the ledges 22 and 23. The cover 24 is provided with spaced internally threaded mounting studs 26 which are adapted to receive mounting screws 27 extending through suitable apertures in the splash plate 12 or other member upon which it may be desired to mount the device.

Located within the oven compartment 13 at a point which is representative of the oven temperature is a bulb 28 to which is connected a capillary tube 29. The other end of the tube 29 is sealed in the wall of a cap member 30 supported in any suitable manner on the outer surface of the back wall 19 of the casing. The tube 29 is in communication with an annular chamber 31 cooperatively formed by the interior wall of the cap member and a flexible metallic bellows 32 having its closed end disposed adjacent the closed end of the cap member and its other end sealed to a supporting washer 33. This washer is sealed around its periphery to the wall of the cap member. The bulb 28, capillary tube 29, and chamber 31 are filled with a thermally expansible and contractible fluid, as is well known in the art.

It will be readily apparent that as the temperature at the bulb 28 in the oven is increased or decreased, there will be a corresponding increase or decrease of fluid volume acting within the chamber 31 upon the bellows. Since this bellows is mechanically expansible and contractable, there will be a corresponding movement of the free bottom end of the bellows.

A push rod 34, having a head end 35 in engagement with the bottom of the bellows, is supported for sliding movement in the back wall 19 of the casing. Where the rod extends through the back wall, it is provided with a portion 36 of rectangular cross-section which is supported in a rectangular opening 37 in the back wall. Thus, the rod may be moved longitudinally but is retained against rotational movement. A pressure exerting spring 38 is disposed around this end of the push rod, one end of this spring bearing against the head 35 of the rod and the other end bearing against the back wall of the casing. This spring acts to maintain the head end of the rod against the bottom of the bellows and forces the bottom in a direction opposing the fluid pressure within the chamber 31.

With this arrangement, it will be apparent that the push rod will be actuated with relatively small longitudinal movements in response to the effect of temperature changes acting on the tube 28 within the oven. Since these movements of the push rod are relatively small, it would be impracticable to utilize these movements directly for the actuation of a switch mechanism for controlling the heating element of the oven. Consequently, a mechanism is provided for amplifying and transmitting these relatively small movements, so that they may be efficiently controlled and utilized for the operation of the switch mechanism.

For this purpose, a pivot bar 39 having a central opening 40 through which the push rod extends, is mounted on the back wall 19 of the switch housing. This bar projects on either side of the push rod and has its ends upwardly deflected to form knife-edged supports 41 and 42. Extending at right angles to the push rod and slidably supported on the push rod is a main lever 43 having openings 44 adjacent its ends for receiving the supports 41 and 42 therethrough. The main lever is longitudinally strengthened by integrally formed side flanges 45 which, if desired, may be tapered from substantially the midpoint towards the ends of the bar. The extreme ends of the main lever are deflected in the same direction as the side flanges to form the end legs 46 and 47, each containing a transversely extending slotted opening 48.

As shown in Figures 2 and 4, the legs 46 and 47 are operatively connected with toggle actuating levers 49 and 50 which extend in opposite directions from the push rod 34 and are respectively fulcrumed adjacent their outermost ends on the knife-edged supports 41 and 42. The levers 49 and 50 are respectively pivotally connected at their outermost ends with the legs 46 and 47 by means of an end projection 51 on each lever, this projection being arranged to extend into the slot opening 48 of the associated end leg of the main lever.

At their innermost ends the levers 49 and 50 are each provided with an end slot 52 which permits straddling of the push rod. It will also be noted that these ends of the levers 49 and 50 are each deflected to form end flanges 53 which are in abutting relation and adapted to bear against an end flange 54 formed on a flanged collar 55 concentrically disposed around the push rod 34 and in sliding engagement with an internal elongate sleeve 56 also surrounding the push rod 34. This sleeve is readily slidable on the push rod in a lengthwise direction and has one end bearing against a washer 57 which in turn bears against the main lever 43. The other end of the sleeve 56 bears against an abutment washer 58 which is disposed between this end of the sleeve and a control nut 59 threaded onto the adjacent end of the push rod.

As shown in Figure 2, there is mounted in a suitable opening in the cover 24 a tubular supporting bracket 60 which surrounds the innermost end of the nut 59, the washer 58 and the associated end of the sleeve 56 to form a guiding support for this end of the push rod. A ring shaped toggle carrier 61 is carried by the flanged collar 55 and normally held against the flange 54 thereof by a spring 62, one end of this spring bearing against the carrier and the other end bearing against an abutment washer 63 which surrounds the tube 56 and is in engagement with the innermost end of the tubular bracket 60.

The toggle carrier is provided with a pair of diametrically disposed parallel guiding arms 64 which extend towards the levers 49 and 50 and pass through suitable openings 64ª therein. In quadrature to the arms 64 is a pair of similar arms 65 which are disposed on opposite sides of the push rod and extend in the opposite direction from the arms 64—64.

The arms 65—65 form pivotal supports for the innermost ends of oppositely extending toggle plates 66 and 67, these plates having their innermost ends in knife-edged connection, as shown at 68, with the arms 65—65. The toggle plates are resiliently retained with their innermost ends bearing against the arms 65—65 by means of suitable laterally disposed springs 69 tensioned between suitable lugs 70—70 adjacent the outermost ends of the plates.

With the arrangement just described, it will be noted that the toggle plates may be swung about their knife-edged connection with the arms 65, and that in doing so, the plates will pass through dead center positions and be actuated or impelled to one side or the other of the dead center position by the action of the tensioning springs 69.

The outer end of each toggle plate has a contact carrier 71 of suitable insulating material secured thereto as by rivets 72. This carrier insulatingly supports a contact bar 73 which is cupped intermediate its ends, as shown at 74, to form a rounded bearing or pivot which is retained seated within a suitable recess in the surface of the contact carrier, as by a rivet 75. Thus, the bar is supported for rocking movement and provides a self-aligning support for contact buttons 76 at the ends of the bar. Rotative movement of the contact bar about the pivot 75 is prevented by forming the insulating carrier with a lip portion 77 extending past one of the lateral edges of the contact bar.

The contact buttons 76 are arranged to respectively engage with the head of a contact terminal bolt 78 which is supported in a contact mounting block 79 of insulating material. Each contact bolt 78 extends through a suitable opening 80 in the back wall of the casing, and the mounting block 79 may be provided with a boss 81 which extends through the opening and insulates the contact bolt from the casing at this point. The mounting block and contact bolt may be secured in position by means of a securing nut 82 which may be threaded onto the bolt and tightened against an insulating strip 83 disposed between the nut and the back wall of the casing and having a suitable aperture for receiving the contact bolt therethrough. The terminal strip 83 may be utilized for supporting additional terminal connections as may be required.

It will be noted that the stationary contact operates to limit swinging movement of the toggle plate in one direction. Movement of the plate in the opposite direction is limited by an adjustable screw stud 84 which may be retained in adjusted position by means of a suitable lock nut 85. One of these adjustable studs is supported in the ledge 23, and one of the studs is also mounted in the ledge 22 for respectively limiting the movements of toggle plates 66 and 67 as described.

By utilizing the system of levers previously described, the relatively small movements of the push rod 34 will be amplified to cause relatively larger movements of the arms 65—65 of the toggle carrier. The movement of the arms 65—65, in cooperation with the stop members for the toggle plates, will actuate the switch contacts into open or closed position with a snap action in the following manner:

Referring to Figure 2, wherein the contacts are disclosed as being in opened position and the toggle plates abutting the associated ends of the stop studs 84, it will be apparent that if the temperature acting on the bulb 28 is decreased, the volume in the chamber 31 will likewise decrease and the push rod will be moved downwardly by the action of spring 38. This movement of the push rod carries with it the main lever 43, which acts to pivot the toggle actuating lever 49 in a counterclockwise direction and the toggle actuating lever 50 in a clockwise direction. Since the innermost ends of these levers bear against the flange 54 of the flanged collar 55, this collar will be moved upwardly along the sleeve 56 against the action of spring 62. This movement of the flanged collar carries with it the toggle carrier and moves the arms 65 in an upward direction, thus causing plate 67 to swing in a counterclockwise direction about its bearing on the associated end of stop stud 84, and the toggle plate 66 to similarly swing about its associated stop 84 in a clockwise direction. As this movement continues, the toggle plates will reach a dead center position, and as soon as they pass through the dead center position the springs 69 immediately snap them to a position wherein the contacts will be closed.

Closing of the contacts will complete the circuit to the oven-heating unit, and as soon as the temperature in the oven, which is acting on the bulb 28, reaches a predetermined maximum value, the contacts will again be opened in the following manner:

As the temperature acting on the bulb 28 increases, the volume within the chamber 31 likewise increases and causes a contraction of the bellows to move the push rod upwardly against the pressure of spring 38. This upward movement of the push rod releases the pressure acting downwardly against the main lever 43 and permits spring 62 to move the toggle carrier and flanged collar downwardly on the sleeve 56. This movement acting against the inner ends of the toggle actuating levers 49 and 50 causes them to be respectively rotated in clockwise and counterclockwise directions about the knife-edged supports 41 and 42 and causes the main lever to move upwardly and follow the movement of the push rod.

As the downward movement of the toggle carrier continues, the arms 65—65 cause the toggle plates 67 and 66 to respectively pivot about their contacts in a clockwise and counter-clockwise direction. During this movement, the plates will again assume a dead center position and, as soon as they pass through the dead center position, will be again actuated by the springs 69 to positions against the stop studs 84, in which positions the contacts are again open.

The thermostatic regulator of the present invention is arranged to be pre-set to regulate the oven temperature at a desired value. In practice, the oven temperatures might be between the limits of 0° as a minimum and approximately 650° F. as a maximum. Presetting of the device is accomplished through means which are arranged to vary the position of the arms 65—65 independently of their actuation by the action of the push rod 34. It will be apparent that with the contacts in closed position, the temperature will have to increase a sufficient amount to move the arms 65 so as to carry the toggle plates through dead center position. Moreover, the position of the arms 65 and the amount of movement of these arms before the dead center position is reached will determine the amount of movement and, consequently, the maximum temperature which must be reached before the contacts are opened.

Adjustment of the position of the arms 65—65 is accomplished by manually manipulating the lever mechanism, by tightening or loosening the control nut 59 on the threaded end of the push rod 34. For such purpose, the knob dial 17 is provided. The knob dial has a knob portion 86 which is integrally formed with a peripheral skirt 87. The knob dial may be formed of any suitable material but is preferably made of molded plastic.

The knob has a central tubular hub portion 88 which is arranged to rotatably extend over the tubular supporting bracket 60. The knob is lockingly connected with the control nut 59 by means of a locking washer 89 of sufficient diameter to overlap the hub portion of the knob at its periphery. The upper end of the control nut is provided with a slot 90 which is slightly off center and arranged to receive downwardly struck fingers 91 and 92 formed in the lock washer 89. These fingers are likewise displaced to one side of the diameter of the washer so that the washer will interlock with the control nut at only one position.

The washer 89 is secured to the knob by screws 93 threaded into the knob body at the periphery of the washer, each of these screws clamping against the peripheral margin of the washer 89. Removal of the knob is prevented by a retaining screw 94 having a contracted threaded shank portion threaded into the head of the control nut. This contracted portion defines an abutment shoulder 95 which abuts the end of the control nut and prevents tightening of the head of the retaining screw against the upper surface of the washer 89. In other words, with the arrangement described, the knob may be slightly moved in an axial direction.

The skirt 87 previously referred to, as shown in Figure 6, is provided with temperature-setting indicia 96, as well as indicia 97 indicating the "off" position of the dial.

In order that the screws 93 and 94 and the other parts in the top of the knob may be concealed, and so that the knob may have a more finished appearance, a snap-on cover 98 is provided.

For limiting the rotative movement of the knob, the tubular hub portion 88 is provided with an axially extending rib 99 on its outer surface. Adjacently disposed to the knob hub and pivotally mounted on one of the mounting studs 26 is a rotatable plate 101 which is actuated by a spring 102 in a rotative direction towards the hub. This plate is provided with an angular projection 103 adapted to ride on the surface of the hub and thus supply a frictional drag opposing movement of the dial knob. This frictional drag prevents changing of the dial setting due to inadvertent or accidental contact with it.

Swinging movement of the plate 101 away from the hub is limited by a pin or rivet 104 which extends into an arcuate slot 104ª in the plate. Since the projection 103 is disposed in the path of movement of the rib 99, the projection 103 also serves as an abutment stop for the rotative movement of the dial, which is permitted to rotate substantially 360°.

As an added feature of the dial stop, it has been found desirable to provide a click action when the dial reaches "off" position so as to apprise the operator through the sense of touch that the dial has reached "off" position. This is accomplished by providing a recess 105 at the base of the rib 99 and adjacent one of its sides. This recess is adapted to resiliently receive the angular portion of the projection 103 therein when the dial reaches "off" position. Movement of the projection 103 from the normal outer surface of the hub into the recess 105 causes a perceptible click of the dial which apprises the operator of the fact that the dial has reached "off" position.

As further shown in Figure 8, the dial at the limits of its movements is not brought to a dead stop, but when pressure is applied in a direction to move the rib forcibly against the projection 103, the plate will be rotated against the pressure of the spring 102 and the projection raised, as shown in dotted lines. While this projection is not raised sufficiently to permit the rib to pass thereunder, the increased force necessary to rotate the plate and raise the projection will immediately advise the operator that the dial cannot be turned further in that direction. This yielding limit stop also prevents the application of such turning forces on the dial as might tend to cause injury to the parts, when it is attempted to rotate the dial against the stop.

Of course, it will be understood that the dial is calibrated so as to have the proper spacings between the temperature graduations. If, however, it should be found that the regulating temperature as indicated on the dial for a selected setting does not agree with the actual oven temperature, the device may be easily adjusted to indicate correctly.

This adjustment is accomplished by first loosening the screws 93 which will permit the dial to be freely rotated. The dial is then set so that its indicated temperature reading will correspond with the actual measured oven temperature, as shown by a thermometer or other temperature indicating device. The dial is then held against turning and the control nut 59 adjusted by turning it in a clockwise direction until the switch contacts snap to closed position. The control nut is turned by turning the screw 94 which is screwed tightly thereinto. The dial and control nut are then in proper relation and may be locked together by tightening the screws 93.

Having adjusted the device as just described, it will be evident that, if the dial is moved counter-clockwise from any pre-set position to the "off" position of the dial, the arms 65—65 will be moved and carry the toggle plates through their dead center positions and cause the contacts to open. The point on the dial where opening of the contacts occurs will, of course, depend upon the oven temperature and will approach the "off" position of the dial as the oven temperature is decreased. Movement of the dial in a clockwise direction from the "off" position will cause the contacts to close and energize the heating element.

In order to prevent the thermal responsive mechanism from closing the contacts of the device, however, when the dial is in "off" position, the "off" position of the dial is made to correspond to a temperature setting which is lower than the lowest room or ambient temperature likely to be encountered.

The present invention provides a single unit control for the oven, and it is only necessary to actuate one knob when turning the oven "on" and "off", or presetting the device to regulate the oven temperature at a selected value. Additional control switches are therefore unnecessary, although the device is readily adapted for and may be used in installations where additional control switches may be desired. For example, where a separate control switch is used to selectively connect the oven heating unit for "pre-heat," "broil" and "bake" operations.

From the foregoing description, it will be apparent that the present invention provides a thermostatic regulator having improved operating characteristics, wherein circuit controlling contacts will be actuated to open and closed positions with a "snap" action; which embodies improved means for transmitting and amplifying the relatively small movements of a temperature responsive element so as to enable their more efficient use for the operation of circuit controlling contacts; which has improved means for presetting the device for regulating at a predetermined temperature; which is provided with an improved temperature setting dial; which may be adjusted independently as to the temperature indicated for any operating condition of the device; which further embodies improved means for resiliently opposing setting movements of the dial, limiting the rotative movements of the dial, and further imparting a "snap" action to the dial when it is moved to "off" position, whereby the operator may be apprised of such position through the sense of touch; and which embraces a single unit control for the oven having only one knob by means of which the oven can be turned "on" or "off", and the device pre-set to regulate the oven temperature at a desired value.

I am aware that many changes may be made and numerous details of construction may be varied through a wide range without departing from the principles of the herein-described invention, and I, therefore, do not purpose limiting the patent granted hereon otherwise than necessitated by the scope and spirit of the appended claims.

I claim as my invention:

1. In a thermostatic control switch, a rod, a fulcrum carried by said rod and supported for relative movements thereon, a member associated with said fulcrum for limited swinging movements to positions disposed on either side of a dead center position thereof, when the fulcrum is moved in opposite directions, means resiliently actuating said member with a snap action towards one or the other of said limits when it is moved past dead center, contacts opened and closed in response to the movements of the member, means biasing said fulcrum for movement in one direction on the rod, thermo-responsive means acting to move said rod in accordance with temperature changes, and a motion amplifying connection between said rod and said fulcrum for moving the fulcrum on the rod in the other direction.

2. In a thermostatic control switch, a movable fulcrum, a member associated with said fulcrum for limited swinging movements to positions disposed on either side of a dead center position thereof, when the fulcrum is moved in opposite directions, means resiliently actuating said member with a snap action towards one or the other of said limits when it is moved past dead center, contacts opened and closed in response to the movements of said member, a rod reciprocably movable in response to temperature changes and forming a guide for movements of said fulcrum, means biasing said fulcrum for movement in one direction, and a motion amplifying connection between said rod and said fulcrum acting to move the fulcrum in an opposite direction against the force of said biasing means.

3. In a thermostatic control switch, a rod, a fulcrum carried by the rod and supported for relative movements thereon, a member associated with said fulcrum for limited swinging movements to positions disposed on either side of a dead center position thereof, when the fulcrum is moved in opposite directions, means resiliently actuating said member with a snap action towards one or the other of said limits when it is moved past dead center, contacts opened and closed in response to the movements of said member, a spring acting against one side of said fulcrum for moving it in one direction on the rod, and thermo-responsive means acting through the rod to move the fulcrum in an opposite direction on the rod in response to temperature changes.

4. In a thermostatic control switch, a rod, a fulcrum carried by the rod and supported for relative movements thereon, a member associated with said fulcrum for limited swinging movements to positions disposed on either side of a dead center position thereof, when the fulcrum is moved in opposite directions, means resiliently actuating said member with a snap action towards one or the other of said limits when it is moved past dead center, contacts opened and closed in response to the movements of said member, a spring acting against one side of said fulcrum for moving it in one direction on the rod, and thermo-responsive means acting through said rod to move the fulcrum thereon in a direction against said biasing means and including a motion amplifying connection for increasing the movement of the fulcrum due to the movement of the rod.

5. A temperature control device comprising a rod, a temperature responsive element for moving said rod, a fulcrum supported for movements in opposite directions along said rod, a spring acting to move the fulcrum in one direction along the rod, an abutment carried by said rod and movable therewith, a lever connection acted upon by movement of said abutment in one direction for moving the fulcrum in an opposite direction against said spring, and switch means pivoted on said fulcrum actuated to open and closed positions by the movements of said fulcrum.

6. A temperature control device comprising a rod, a temperature responsive element for moving said rod, a fulcrum supported for movements in opposite directions along said rod, a spring acting to move the fulcrum in one direction along the rod, an abutment carried by said rod and movable therewith, a lever connection acted upon by movement of said abutment in one direction for moving the fulcrum in an opposite direction against said spring, switch means pivoted on said fulcrum actuated to open and closed positions by the movements of said fulcrum, and means for manually adjusting the position of said abutment along said rod for varying the effective temperature at which said switch means will be actuated.

7. A temperature control device comprising a rod, a temperature responsive element for moving said rod, a fulcrum supported for movements in opposite directions along said rod, a spring acting to move the fulcrum in one direction along the rod, an abutment carried by said rod and movable therewith, a lever connection acted upon by movement of said abutment in one direction for moving the fulcrum in an opposite direction against said spring, switch means pivoted on said fulcrum actuated to open and closed positions by the movements of said fulcrum, and dial presetting means for manually varying the position of said abutment along said rod for changing the effective temperature at which said switch means will be actuated.

8. A temperature control device comprising a rod, a temperature responsive element for moving said rod, a fulcrum supported for movements in opposite directions along said rod, a spring acting to move the fulcrum in one direction along the rod, means carried by said rod for opposing movement of the fulcrum in said one direction by said spring, said means being adjustable to move the fulcrum against said spring, whereby the position of the fulcrum relative to said rod may be preset, and switch means pivoted on said fulcrum and actuated to open and closed positions by the movements of said fulcrum.

9. A temperature control device comprising a frame structure, a rod guided in said frame for reciprocable movements, a temperature responsive element for moving said rod, a member movable axially of said rod, a spring surrounding said rod between said frame and the member, said spring acting to move the member in one direction along the rod, a connection for transmitting movement of said rod in one direction against the member for moving it in an opposite direction against said spring and enabling movement of the member by the spring when the rod is moved in an opposite direction, and a snap switch controlled by movements of said member.

10. A temperature control device comprising a frame, a rod guided in said frame for reciprocable movements, a temperature responsive element for moving said rod, a support slidable axially of said rod, a spring surrounding said rod between the frame and the support acting to move the support in one direction along the rod, a connection for transmitting movement of the rod in one direction against the support for moving it in an opposite direction against said spring and enabling movement of the support by said spring when the rod is moved in an opposite direction, and switch means including an arm swingably mounted on said support for movements to switch controlling positions in response to movements of said support.

11. A temperature control device comprising a frame, a rod guided in said frame for reciprocable movements, a temperature responsive element for moving said rod, a support slidable axially of said rod, a spring surrounding said rod between the frame and the support acting to move the support in one direction along the rod, a connection for transmitting movement of the rod due to a decrease in temperature to the member in a direction for moving the member against said spring, and enabling movement of the member by the spring upon movement of the rod due to an increase in temperature, and a snap switch controlled by movements of the member.

12. A temperature control device comprising a frame, a rod guided in said frame for reciprocable movements, a temperature responsive element for moving said rod, a support slidable axially of said rod, a spring surrounding said rod between the frame and the support acting to move the support in one direction along the rod, a connection for transmitting movement of the rod due to a decrease in temperature to the member in a direction for moving the member against said spring, and enabling movement of the member by the spring upon movement of the rod due to an increase in temperature, a snap switch controlled by movements of said member, and means for adjusting said connection for pre-setting the relative position of said member on said rod for a predetermined temperature.

13. A temperature control device comprising a frame structure, a rod guided in said frame for reciprocable movements, means including a temperature responsive element for moving said rod, a fulcrum member slidably carried by the rod for movements therealong in opposite directions, a spring surrounding the rod between a part of the frame structure and the fulcrum member acting to move the member in one direction along the rod, a sleeve slidable on said rod, a multi-lever movement amplifying connection between the sleeve and the fulcrum member, switch means pivoted on said fulcrum for movements to open and closed positions in response to movements of the fulcrum resulting from movements of the rod and sleeve as a unit due to temperature changes, and a dial having a threaded connection with one end of the rod, said dial being adjustable to independently vary the position of the sleeve on said rod and act through said multi-lever connection to vary the position of said fulcrum member relative to said rod, whereby the device may be pre-set for actuation at a desired effective temperature.

GORDON H. BROWN.